US010624322B2

(12) United States Patent
Vandenborre

(10) Patent No.: US 10,624,322 B2
(45) Date of Patent: Apr. 21, 2020

(54) AQUAPONIC UNIT

(71) Applicant: SOLAR ENERGY CONVERSION POWER CORPORATION, Turnhout (BE)

(72) Inventor: Hugo Vandenborre, Kasterlee (BE)

(73) Assignee: SOLAR ENERGY CONVERSION POWER CORPORATION, Turnhout (BE)

( * ) Notice: Subject to any disclaimer, the term of this patent is extended or adjusted under 35 U.S.C. 154(b) by 0 days.

(21) Appl. No.: 16/303,808

(22) PCT Filed: May 26, 2017

(86) PCT No.: PCT/EP2017/062806
§ 371 (c)(1),
(2) Date: Nov. 21, 2018

(87) PCT Pub. No.: WO2017/203053
PCT Pub. Date: Nov. 30, 2017

(65) Prior Publication Data
US 2019/0335722 A1 Nov. 7, 2019

(30) Foreign Application Priority Data
May 26, 2016 (BE) .................................. 2016/5390

(51) Int. Cl.
*A01K 63/04* (2006.01)
*A01K 61/10* (2017.01)
*A01K 61/50* (2017.01)
*A01G 31/00* (2018.01)

(52) U.S. Cl.
CPC ............ *A01K 63/042* (2013.01); *A01G 31/00* (2013.01); *A01K 61/10* (2017.01); *A01K 61/50* (2017.01)

(58) Field of Classification Search
None
See application file for complete search history.

(56) References Cited

U.S. PATENT DOCUMENTS

| | | | | |
|---|---|---|---|---|
| 7,531,254 B2 * | 5/2009 | Hibbs | ............... | H01M 8/04097 429/418 |
| 8,181,391 B1 * | 5/2012 | Giacomantonio | ..... | A01G 9/025 47/59 R |
| 9,214,694 B2 * | 12/2015 | Dubois | ...................... | C25B 9/10 |
| 9,493,881 B2 * | 11/2016 | Kosmoski | ................. | C25B 1/16 |
| 9,788,496 B2 * | 10/2017 | Villamar | ................ | A01K 63/04 |
| 9,834,846 B2 * | 12/2017 | Mermelstein | ........... | C25B 15/02 |
| 10,051,866 B2 * | 8/2018 | Code | ........................ | A01N 59/12 |
| 10,219,447 B1 * | 3/2019 | DeCarli | .................... | A01G 9/16 |
| 10,373,238 B2 * | 8/2019 | Hill | .................... | G06Q 30/0635 |
| 2004/0185313 A1 * | 9/2004 | Halter | ............... | H01M 8/04156 429/418 |
| 2005/0138867 A1 * | 6/2005 | Zhao | ......................... | E04H 1/04 52/79.1 |
| 2009/0301399 A1 * | 12/2009 | Brown | ................... | A01G 31/02 119/226 |
| 2009/0313894 A1 * | 12/2009 | Bieber | ................... | A01G 31/00 47/62 R |
| 2010/0003545 A1 * | 1/2010 | Horne | ...................... | B60L 53/54 429/471 |
| 2010/0051450 A1 * | 3/2010 | Murahara | ............... | A01G 31/00 204/240 |
| 2011/0041395 A1 * | 2/2011 | Newbold | ................. | A01G 9/18 47/1.4 |
| 2011/0131880 A1 * | 6/2011 | Kloas | ..................... | A01G 31/02 47/62 R |
| 2013/0039833 A1 * | 2/2013 | Zullo | ........................ | C05C 3/00 423/359 |
| 2013/0255146 A1 * | 10/2013 | Lehman | ................. | A01G 31/00 47/17 |
| 2014/0151293 A1 * | 6/2014 | Curry | ..................... | A01G 9/033 210/602 |
| 2014/0223818 A1 * | 8/2014 | Coghlan | ................ | A01G 31/02 47/62 R |
| 2014/0223819 A1 * | 8/2014 | Coghlan | .............. | A01K 63/045 47/62 R |
| 2015/0196002 A1 | 7/2015 | Friesth | | |
| 2016/0345517 A1 * | 12/2016 | Cohen | ..................... | A01G 31/02 |
| 2017/0152157 A1 * | 6/2017 | Ranger | ..................... | C02F 1/14 |
| 2017/0198244 A1 * | 7/2017 | Gobel | ..................... | C12M 21/02 |
| 2018/0332788 A1 * | 11/2018 | Leo | ......................... | A01G 31/02 |
| 2018/0370867 A1 * | 12/2018 | Lu | ............................. | C05G 3/02 |
| 2019/0085279 A1 * | 3/2019 | Leo | ......................... | C12G 3/06 |

FOREIGN PATENT DOCUMENTS

| | | |
|---|---|---|
| EP | 2149625 A1 | 2/2010 |
| JP | H06197664 A | 7/1994 |
| JP | 2001213388 A | 8/2001 |
| JP | 3273189 B2 | 4/2002 |

(Continued)

OTHER PUBLICATIONS

"Ten Guidelines for Aquaponic Systems" Nelson and Pade, Aquaponics Journal, Issue 46, 2007 3rd Quarter (Year: 2007).*

(Continued)

*Primary Examiner* — Magdalena Topolski
*Assistant Examiner* — Morgan T Barlow
(74) *Attorney, Agent, or Firm* — Workman Nydegger

(57) ABSTRACT

An agricultural unit includes a tank system that is adapted to provide a combined aquatic environment for raising aquatic animals in aquaculture and for cultivating plants in hydroponic culture and an electrochemical device. The tank system releases excretions of the aquatic animals directly into the aquatic environment so as to produce nutrients for the plants while the electrochemical device is operable in an electrolysis mode to produce hydrogen and oxygen while consuming electrical energy provided by a source of electrical energy and is further operable in a fuel cell mode to produce electrical energy and heat by oxidizing the produced hydrogen. The electrochemical device is operatively coupled to the tank system so as to transfer at least part of the produced heat and the produced oxygen to the aquatic environment.

9 Claims, 2 Drawing Sheets

(56) References Cited

FOREIGN PATENT DOCUMENTS

| WO | WO-03069977 A1 * | 8/2003 | ............. A01G 31/00 |
| WO | 2012028491 A1 | 3/2012 | |
| WO | 2013190066 A1 | 12/2013 | |

OTHER PUBLICATIONS

Belgium Search Report from BE Application No. 201605390, dated Feb. 10, 2017.
International Search Report from PCT Application No. PCT/EP2017/062806, dated Sep. 20, 2017.

* cited by examiner

AQUAPONIC UNIT

FIELD OF THE INVENTION

The present invention relates to an aquaponic unit, in particular an aquaponic unit that is energetically independent or autonomous.

BACKGROUND

Aquaculture is a known technique consisting of raising aquatic animals such as snails, fish, prawns and lobsters in a confined and limited tank. In addition to dispensing sufficient amounts of food, known aquaculture systems must use electrically powered heating devices to keep the aquatic environment at the right temperature, and electrically powered aeration devices to provide it with sufficient oxygen to sustain animal life. In addition, depending on the type of animal, electrical pumps may have to be provided to generate a current of the water.

Hydroponic culture is a known technique consisting of cultivating vegetables and herbs in water instead of a soil-based substrate. The water must be provided with sufficient nutrients to sustain plant life.

SUMMARY OF THE INVENTION

According to an aspect of the present invention, there is provided an agricultural unit comprising: a tank system adapted to provide a combined aquatic environment for raising aquatic animals in aquaculture and cultivating plants in hydroponic culture, whereby excretions of said aquatic animals are released into said aquatic environment so as to produce nutrients for said plants; and an electrochemical device; wherein said electrochemical device is operable in an electrolysis mode to produce hydrogen and oxygen while consuming electrical energy provided by a source of electrical energy; wherein said electrochemical device is further operable in a fuel cell mode to produce electrical energy and heat by oxidizing said produced hydrogen; and wherein said electrochemical device is operatively coupled to said tank system so as to transfer at least part of said produced heat and said produced oxygen to said aquatic environment.

JP H06 197664 discloses a pisciculture apparatus provided with a pisciculture water tank and an electrolytic apparatus. US 2015/196002 discloses an automated high-yield aquaponics system.

The term "aquaponic unit" is used herein to designate a unit that combines aquaculture techniques with hydroponic techniques. The term "tank system" is used herein to designate a single container or a system of several containers which form a combined aquatic environment by regular or continuous transfer of water between the various parts of the system (e.g., by pumping water between the tanks, thus carrying waste or nutrients from one tank to the next, optionally passing the water through appropriate filter beds and the like).

It is an advantage of aquaponic units that a synergy is created between plant life, animal life, and bacteria, sustained by a common aquatic environment, in a self-contained system. These three groups of living entities each rely on the other to live: the bacteria consume the fish waste keeping the water clean for the fish; the fish, helped by the bacteria provide the plants with a usable form of nutrients; and the plants help to clean the water the fish live in. As a result, aquaponic units provide a very efficient method of growing food (in particular, for human consumption), using a minimum of water and space, and yielding healthy fish (a source of dietary protein) and vegetables (a source of dietary fiber and vitamins). Additionally, aquaponic systems reduce the need to release waste water into the environment, which typically occurs in traditional aquaculture.

The aquaponic unit according to the present invention has the additional advantage of allowing the system to operate in a continuous manner, even when the source of electrical energy is irregular or only cyclically available. In such cases, an energy storage capacity is required to bridge the periods of unavailability of the electrical energy source. By storing hydrogen during the source's productive periods, the electrochemical device creates a buffer allowing efficient energy production during the source's unproductive periods.

The aquaponic unit according to the present invention has the additional advantage of spectacularly boosting productivity in terms of aquatic animals, by bringing both heat and oxygen produced by the electrochemical device into the aquatic environment. The availability of oxygen allows for aeration of the aquatic environment in a manner that is much more effective than by using ambient air (as ambient air contains only approximately 20% oxygen gas, the latter being poorly soluble in water), and without requiring complex electrical pumping systems.

In an embodiment, the agricultural unit according to the present invention further comprises a renewable energy conversion means coupled to said electrochemical device as said source of electrical energy.

Known sources of renewable energy (solar, wind, wave energy) tend to have cyclical (e.g., diurnal) or irregular availability. These renewable energy sources therefore benefit particularly from the energy buffering capacity (in the form of hydrogen) of the electrochemical device provided by the present invention.

In a particular embodiment, said renewable energy conversion means comprises photovoltaic cells. In another particular embodiment, said renewable energy conversion means comprises a turbine driven by wind. In yet another particular embodiment, said renewable energy conversion means comprises a turbine driven by tidal forces and/or wave energy.

According to an aspect of the present invention, there is provided use of the agricultural unit as described above for the production of aquatic animals. These may include inter alia freshwater fish such as tilapia, carp, koi carp, trout, catfish, barramundi, jade perch, blue gill, and crustaceans such as crayfish, and freshwater prawn.

It has been found that these species are particularly suitable for being raised by aquaculture. These species further benefit from the aquatic environment provided by the unit according to the present invention, which has improved heating and aeration. With a view to sharing the aquatic environment with plant life, it is a further advantage that the listed aquatic animals live in freshwater, as only a few commercially interesting plants can grow in salt or brackish water.

According to an aspect of the present invention, there is provided use of the agricultural unit as described above for the production of plants selected from: red leaf, arugula, radicchio, lettuce, bok choy, endive, watercress, chicory, watermelon, cantaloupe, honeydew melon, cucumbers, tomatoes, okra, Chinese peas, sugar peas, zucchini, summer squash, basil, oregano, parsley, chervil, coriander, green onions, and thyme.

It has been found that these species are particularly suitable for being raised by hydroponic culture. These species further benefit from the aquatic environment provided by the unit according to the present invention, which has improved heating and nutrition.

According to an aspect of the present invention, there is provided use of the agricultural unit as described above, wherein the ratio between the quantity of the aquatic animals and the quantity of the plants is managed so as to maintain a predetermined Feed Rate Ratio.

The amount of animal feed supplied to the system and consumed by the aquatic animals determines the amount of plant nutrients that will be released into the aquatic environment. Balancing the quantity of the aquatic animals and the quantity of the plants in such a way that the amount of plant nutrients being produced equals the amount that the plants can absorb ensures a sustainably healthy aquatic environment. The appropriate quantities may be determined in accordance with the Feed Rate Ratio, which links the amount of animal feed to be supplied to the vegetated surface to be fertilized.

BRIEF DESCRIPTION OF THE FIGURES

These and other technical effects and advantages of embodiments of the present invention will now be described with reference to the accompanying drawings, wherein.

DETAILED DESCRIPTION OF EMBODIMENTS

An agriculture unit according to an embodiment of the present invention will hereinafter be described with reference to FIG. 1.

The agricultural unit 100 comprises a tank system 110 adapted to provide an aquatic environment for raising aquatic animals in aquaculture and cultivating plants in hydroponic culture. Without loss of generality, the tank system 110 is illustrated as comprising two separate tanks: a fish tank (left side) and a plant tank of the "deep water culture" (DWC) type (right side). The reader will appreciate that it is alternatively possible for an agricultural unit 100 according to the invention to operate with a single tank, or with a plurality of tanks that may have different functions. Alternative tank system arrangements (not illustrated) may comprise one or more of a rearing tank for raising and feeding fish, a sump tank situated at the lowest point in the system where water is collected and whence it is redistributed, a fingerling tank for fish farming, a biofilter where nitrification bacteria can grow and convert ammonia into nitrates, and a hydroponics trough where plants grow while absorbing excess nutrients from the water.

Figure 2:
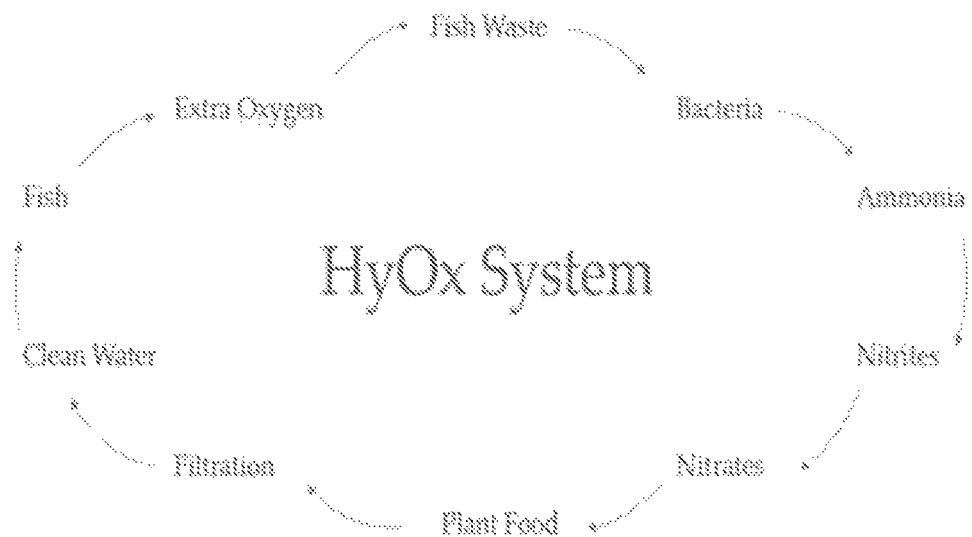
FIG. 2 schematically illustrates the nitrogen cycle underlying the biological processes occurring in embodiments of the present invention.

As indicated before, such an "aquaponic system" provides a synergy between plant life, animal life, and bacteria. Thus, excretions of the aquatic animals are released into the aquatic environment so as to produce nutrients for the plants: in particular, nitrifying bacteria, which naturally live in the soil, water, and air, convert ammonia first to nitrite and then to nitrate which plants can consume, as illustrated in FIG. 2.

The unit 100 further comprises an electrochemical device 130, operable in an electrolysis mode to produce hydrogen and oxygen while consuming electrical energy provided by a source 120 of electrical energy; and operable in a fuel cell mode to produce electrical energy and heat by oxidizing said produced hydrogen. A hydrogen tank may be coupled to the electrochemical device 130 to store the produced hydrogen gas for later use. This electrochemical device 130 is operatively coupled to the tank system 110 so as to transfer at least part of the produced heat and the produced oxygen to the aquatic environment.

Figure 1:
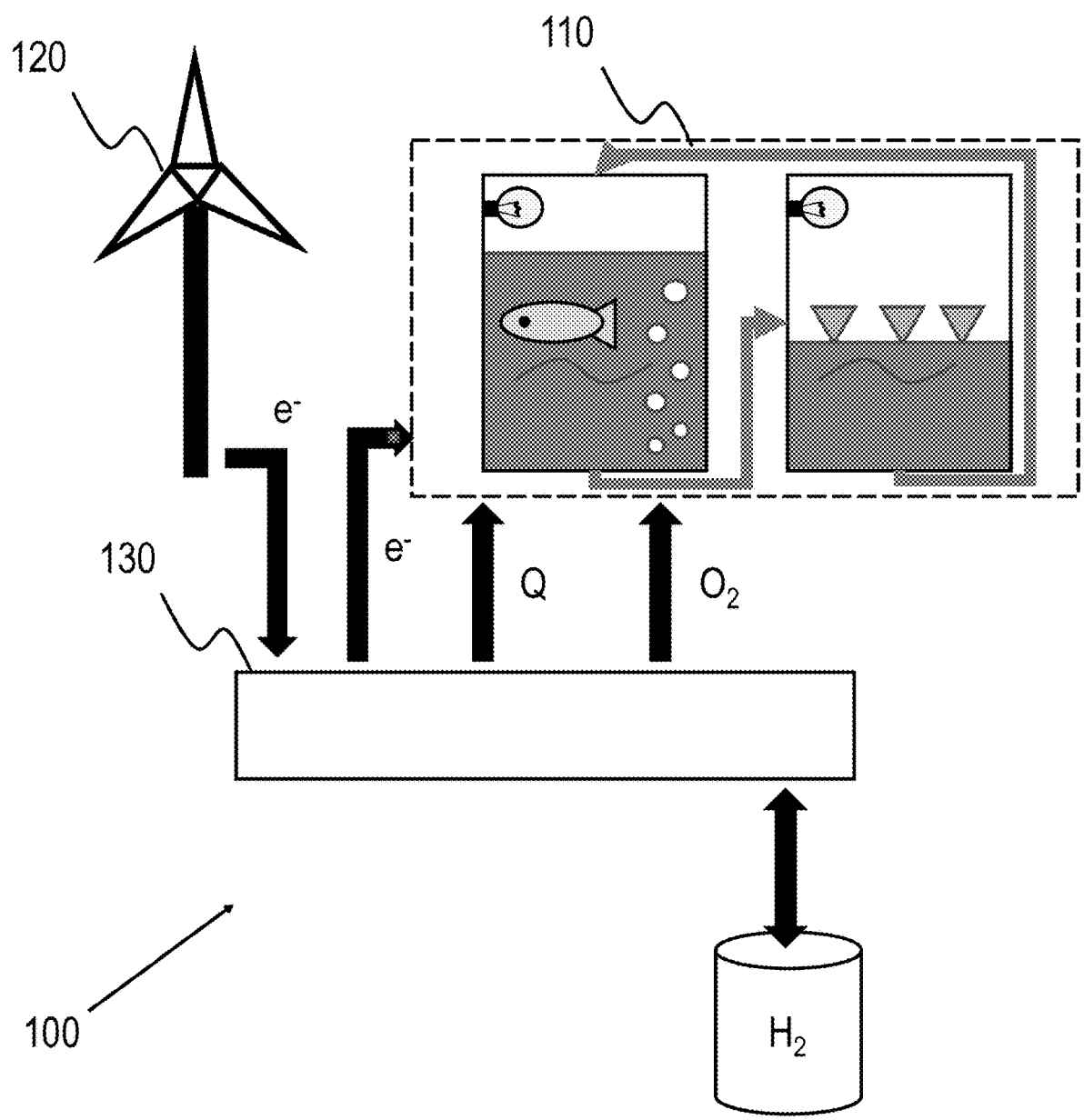
FIG. 1 schematically illustrates an agricultural unit according to an embodiment of the present invention.
Figure 3:
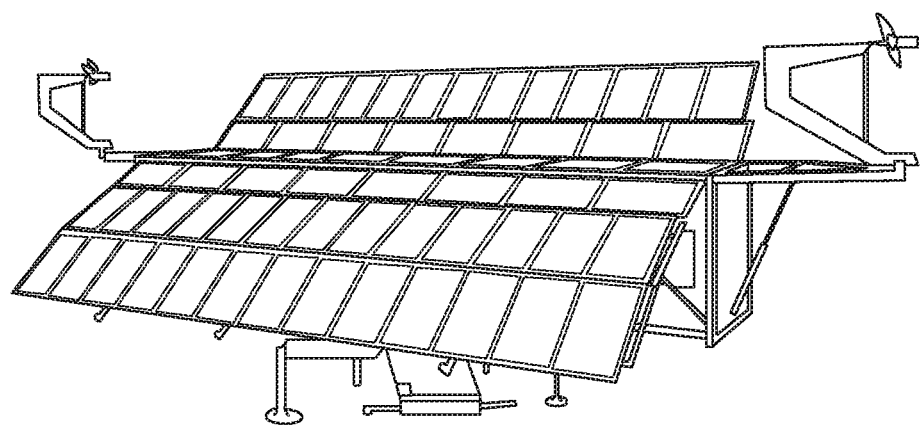
FIG. 3 illustrates an exemplary solar panel assembly that may be used as a source of electrical energy in embodiments of the present invention.

Without loss of generality, the source 120 of electrical energy is illustrated in FIG. 1 as a wind turbine. The skilled person will appreciate that other types of electrical energy sources 120, preferably renewal energy sources, may be used. One particularly advantageous type of renewable energy source that may be used in embodiments of the present invention comprises an assembly of solar (photovoltaic) panels which are mounted on a movable support that is motor-driven so as to keep the panels in an optimal orientation (towards the sun) throughout the day. The support and the panels may be arranged in such a way as to allow the whole to be folded together in a compact form for safe storage (e.g., in a container) when they are not in use. An example of such a movable, foldable solar panel assembly is illustrated in FIG. 3.

Preferably, the electrochemical device 130 is a reversible fuel cell, comprising a series of membrane-electrode assemblies, wherein ion-conductive membranes are placed between successive bipolar electrodes. Suitable electrocatalyst layers are provided between the electrodes and the membranes to enable electrolysis (production of hydrogen and oxygen from water and electricity) and energy generation (production of electricity from hydrogen and oxygen). An electrochemical device suitable for use as the electrochemical device of the present invention is the SOLENCO POWERBOX, an electrochemical energy storage device based on hydrogen technology, commercialized by Solar Energy Conversion Power Corporation (Belgium). The operation of such an electrochemical device is detailed in international patent application publications nos. WO 2012/028491 A1 and WO 2013/190066 A1, the contents of which are expressly incorporated by this reference for the purpose of disclosing the details of the electrochemical device.

The use of such an electrochemical device 130 makes an aquaponics unit more efficient to a surprising degree. As its inputs, the electrochemical device 130 has the surplus of electricity from a source of electrical energy, preferably a source of renewable electrical energy such as a photovoltaic solar energy installation or a wind turbine, and water that may be obtained from precipitation, storage tanks, or an urban water distribution network where available. As its outputs, the electrochemical device 130 has electricity, oxygen, hydrogen, and heat.

The electricity generated by the electrochemical device 130 will cover the needs of the system, without grid dependency. As the device 130 is capable of storing hydrogen, electricity can be produced during the night or during outages. The electricity can cover the electricity consumption of the water pump(s), lighting system, and forced ventilation system.

The oxygen generated by the electrochemical device 130 will be injected to the system to fulfill the biological requirements of the system. This reduces or obviates the need for air pump systems.

The following description of an embodiment of the agricultural unit according to the present invention is provided to illustrate various features and options that may be independently implemented to obtain specific technical effects and advantages.

An exemplary unit is designed with energy conservation in mind, using renewable energy and a reduced number of pumps by letting the water flow downwards (using the gravitation) as much as possible. Preferably, the system uses a single water pump, effecting the following water movements:

Water is pumped up from a sump tank (an exemplary volume of the sump tank may be 500 liters) to a fish tank (an exemplary volume of the fish tank may be 1000 liters);

From the fish tank, the water goes through a media filled bed, acting as a biofilter;

Grow beds and tower plants receive the water (these may represent an exemplary water capacity of approximately 500 liters), filled with nutrients derived from the fish waste;

Both drain back to the sump subsystem.

The inventor has calculated that the pumping requirements for a system according to the exemplary volumes could be met by pump with a nominal power of 90 W.

The electrochemical device, such as a SOLENCO POWERBOX, an electrochemical energy storage device based on hydrogen technology, injects pure oxygen to the sump tank and the fish tanks (10 mg/l of dissolved oxygen).

In a unit according to the invention, the fish tank may be stocked with up to 40 kg of fish per 1 $m^3$ of water (as a point of reference, this corresponds to one mature tilapia per 12 liters of water); this is about double the typical density of present day aquaculture systems, and this increase is due to the drastically improved aeration and water purification provided by the present invention. Accordingly, the yield in animals and plant produce of a unit according to the present invention may be up to twice that of a conventional unit of a similar size.

To optimally use the available sun light, the complete unit or at least the part of the unit containing the plants may be provided in a greenhouse. The heating/cooling requirements for the greenhouse may be determined in view of the desired inside temperature and the expected range of outdoor temperatures. An inside temperature of approximately 22° C. is believed to be appropriate for many types of crops.

The electrochemical unit produces hot water as part of its energy production process. This hot water can be made to circulate and go through the fish tanks. The hot water piping circuit enters in the greenhouse and runs up to a heat exchanger, which may take the form of a radiator with an appropriately dimensioned fan. In this way, the heat from the hot water is transferred to the air and blown out across the green house. For cooling purposes, warm air may be drawn from the greenhouse and led through an underground heat exchanger which allows heat to dissipate into the cooler surroundings.

The plant cultivation (hydroponic) side of the system according to the present invention may make use of known arrangements such as media filled beds, the nutrient film technique (NFT), and deep water culture (DWC):

Media filled beds use containers filled with medium rock of expanded clay. Water from the fish tank is pumped over the medium filled beds, and plants grow in the beds. The medium provides physical support and a location for the bacteria to live. This system can act as a natural biofilter which may reduce or obviate the need for mechanical filtering. In order to obtain sufficient oxygenation of the media for the benefit of the plants' root system and the bacterial life, the media beds may be provided with reciprocating water height controlling means such as siphons or timed pumps.

In NFT systems, nutrient rich water is pumped down enclosed gutters, forming a thin layer (the "nutrient film"). Plants are arranged in small plastic cups allowing their roots to access the water and absorb the nutrients. NFT has proven to be particularly suitable for leafy green vegetables, whose root systems have a limited spatial extent and which do not become very heavy during their development.

In DWC systems, plants float on top of a water surface, allowing the roots to hang down in the water. Water from the fish tank may be pumped through a filtration system (such as a media filled bed), and then into long channels where rafts filled with plants float on the water surface, allowing the plants to extract the nutrients. It should be noted that it is also possible to float a plant-carrying raft directly on the water surface of the fish tank, thus removing the need for having multiple water containers and pumping systems between them.

In order to allow for the effective removal of solid wastes, for adding bases to neutralize acids, for maintaining water oxygenation, and similar functions, a unit according to an embodiment of the present invention may be grouped into several components or subsystems. The functions of these components may be controlled by measuring certain properties of the aquatic environment, such as measurement of the amount of certain substances present in the water (e.g., calcium carbonate, chlorine, ammonia, nitrate, nitrite, oxygen, microbial contaminants), temperature, and pH. Based on these measurements, systems may be controlled to obtain and maintain the desired (biologically optimal) conditions, for example:

a temperature around 22° C. (the target temperature may vary depending on the animal species);

a pH in the range between 7 and 7.5;

a level of dissolved oxygen in the water around 10 mg/l (the target level may vary depending on the animal species, see below);

a nitrate level below 150 mg/liter (ammonia, a constituent of the animal excrement, is turned into nitrates by the nitrogen cycle of bacteria);

minimal presence of chlorine, the excess being removed by filtration or neutralized by additives and/or air and sunlight treatment;

hard water with high levels of calcium carbonate can be treated with phosphoric acid before being added to the system;

water with a risk of microbial contamination can be sand filtered and exposed to treatment with ultraviolet light.

As indicated above, it is necessary to keep the oxygen or dissolved oxygen level sufficiently high to sustain animal life (fish and crustaceans) and bacterial activity. Oxygen dissolves poorly in water, and aquatic species hence spend a great deal of energy to recover the small amount of dissolved oxygen from the water. Temperature, barometric pressure, and salinity, all directly affect oxygen concentrations in both air and water. In addition, each species has varying tolerances to low levels of dissolved oxygen. Salmonids (such as trout), as a group, require 6.0 to 8.0 mg/l of dissolved oxygen. For catfish and tilapia, allowable minimum levels can be as low as 2.0 or 3.0 mg/l although the recommended levels are 5.0 to 6.0 mg/l.

It is an advantage of the present invention that the level of dissolved oxygen in the aquatic environment can be increased up to the desired level by injecting the oxygen produced by the electrochemical device into the water (in particular, into the sump tank—if present—and/or directly into the fish tank).

In order to avoid the accumulation of an excess or deficit of nutrients, the quantities of animals and plants and the size of the biofilter all need to be balanced. It is known from literature that every 50-80 g of animal feed that enters the system daily and is consumed by the animals can fertilize 1 $m^2$ of plant growing area (this ratio is known as the Feed Rate Ratio). The required size of the animal population can thus easily be calculated from the amount of feed that corresponds to the total plant growing area that is to be fertilized in accordance with the Feed Rate Ratio.

While the invention has been described hereinabove with reference to specific embodiments, this was done to illustrate and not to limit the invention, the scope of which is to be determined by reference to the accompanying claims.

The invention claimed is:

1. An agricultural unit comprising:
a tank system configured to provide a combined aquatic environment for raising aquatic animals in aquaculture and cultivating plants in hydroponic culture, wherein excretions of said aquatic animals are released directly into said aquatic environment so as to produce nutrients for said plants; and
an electrochemical device;
wherein said electrochemical device operates in an electrolysis mode to produce hydrogen and oxygen while consuming electrical energy provided by a source of electrical energy;
wherein said electrochemical device further operates in a fuel cell mode to produce electrical energy and heat by oxidizing said produced hydrogen; and
wherein said electrochemical device is operatively coupled to said tank system so as to transfer at least part of said produced heat and said produced oxygen to said aquatic environment.

2. The agricultural unit according to claim 1, further comprising a renewable energy conversion means coupled to said electrochemical device as said source of electrical energy.

3. The agricultural unit according to claim 2, wherein said renewable energy conversion means comprises photovoltaic cells.

4. The agricultural unit according to claim 2, wherein said renewable energy conversion means comprises a turbine driven by wind.

5. The agricultural unit according to claim 2, wherein said renewable energy conversion means comprises a turbine driven by at least one of tidal forces and wave energy.

6. The agricultural unit according to claim 1, wherein the agricultural unit is configured for production of aquatic animals, the aquatic animals comprising freshwater fish provided in the aquatic environment of the tank system.

7. The agricultural unit according to claim 1, wherein the agricultural unit is configured for production of aquatic animals, the aquatic animals comprising crustaceans provided in the aquatic environment of the tank system.

8. The agricultural unit according to claim 1, wherein the agricultural unit is configured for production of plants selected from: red leaf, arugula, radicchio, lettuce, bok choy, endive, watercress, chicory, watermelon, cantaloupe, honeydew melon, cucumbers, tomatoes, okra, Chinese peas, sugar peas, zucchini, summer squash, basil, oregano, parsley, chervil, coriander, green onions, and thyme;
wherein the plants are provided in the aquatic environment of the tank system.

9. The agricultural unit according to claim 1, wherein the agricultural unit is configured to maintain a Feed Rate Ratio between said aquatic animals and said plants.

* * * * *